United States Patent [19]
Abbe

[11] 3,775,678
[45] Nov. 27, 1973

[54] IMPEDANCE COMPARING CIRCUIT WITH GROUND REFERENCED READOUT AND STRAY CAPACITANCE INSENSITIVITY

[75] Inventor: Robert C. Abbe, Newton, Mass.
[73] Assignee: ADE Corporation, Watertown, Mass.
[22] Filed: Dec. 9, 1971
[21] Appl. No.: 206,357

[52] U.S. Cl. ......... 324/60 C, 324/57 R, 324/DIG. 1
[51] Int. Cl. ..................... G01r 11/52, G01r 27/26
[58] Field of Search ............. 324/60 C, 60 R, 57 R, 324/61 R, DIG. 1

[56] References Cited
UNITED STATES PATENTS

| | | | |
|---|---|---|---|
| 3,012,192 | 12/1961 | Lion | 324/60 R X |
| 3,111,845 | 11/1963 | Prigozy | 324/61 R X |
| 3,424,977 | 1/1969 | Krobath | 324/61 R |
| 3,497,801 | 2/1970 | Clower et al. | 324/60 R |
| 3,577,072 | 5/1971 | Miller | 324/60 C |
| 3,639,832 | 2/1972 | Goebbels | 324/60 R X |
| 3,688,190 | 8/1972 | Blum | 324/61 R |

Primary Examiner—Stanley T. Krawczewicz
Attorney—C. Yardley Chittick et al.

[57] ABSTRACT

An impedance comparing circuit for supplying excitation to equal or unequal reference and sensing impedances with a ground referenced output signal indicative of the difference between impedances. A diode matrix excites the reference and sensing impedances from an oscillator through first and second DC blocking impedances respectively during one polarity of current and in the reverse relationship during the opposite polarity of current. Low impedance values in the first and second impedances provide near equality in the voltage across the reference and sensing impedances and minimize the effect of capacitance between them. Tuning or increased diode matrix impedances will augment the sensitivity at a sacrifice in the elimination of the effect of capacitance between the reference and sensing impedances.

12 Claims, 3 Drawing Figures

PATENTED NOV 27 1973　　3,775,678

INVENTOR
ROBERT C. ABBE

BY Charles E. Pfund

ATTORNEYS

IMPEDANCE COMPARING CIRCUIT WITH GROUND REFERENCED READOUT AND STRAY CAPACITANCE INSENSITIVITY

BACKGROUND OF THE INVENTION

The area of this invention is instrumentation for sensors which have an electrical element whose impedance varies in response to a parameter being sensed. Commonly, the varying impedance being sensed is capacitance and a second reference capacitive impedance is provided to allow a comparison between the electrically excited response of the sensing and reference impedances. An example of a probe of this type is shown in my copending application Ser. No. 64,240, now U.S. Pat. No. 3,706,919.

In applications where there is likely to be an environmental effect on the sensing impedance from factors other than the parameter being sensed it is desirable that the reference impedance be subjected to the same error inducing effect. Usually this requires that these two impedances be close to each other creating a problem in stray capacitances between the reference and sensing impedances.

Today's automation and electronics systems often demand that the outputs of instrumentation sensing parameter variations be further processed by electronic circuits. Accuracy becomes far easier and cheaper if the outputs of sensor instrumentation are all referenced to a ground potential which is common to the capacitance sensed and to the excitation. Variations from that ground potential, indicative of the parameter sensed, are more accurately detected. Typical bridge circuits usually used for this instrumentation, however, have an output which is taken between two high voltage points, or if measured with respect to ground has a potential which has a high constant RMS potential masking small variations. These prior art bridge circuits also lose their linearity when the sensing and reference impedances differ by significant amounts.

Since an AC excitation is necessary for sensing capacitance variations it is advantageous to provide rectification so that the output signal is DC and not subject to stray capacitance loading in cables or elsewhere. It is also desirable to have only the DC component pass a metering device for the output signal. Straight rectification of an AC output which varies around zero, however, has the disadvantage of operating in the non-saturating region of rectifiers where added non-linearities and environmental dependence are present.

It is thus a general object of this invention to provide electronic circuit instrumentation for sensing and reference impedances which is relatively simple and accurate, not sensitive to stray capacitance between the impedances or between the output and ground and which provides a convenient output for further electronic processing.

It is a specific object of the present invention to provide electronic circuit instrumentation for sensing and reference impedances which maintains the instantaneous potentials across the impedances approximately equal.

It is a further specific object of the present invention to provide electronic circuit instrumentation for sensing and reference impedances with an output signal which varies from circuit ground by an amount indicative of the parameter being sensed.

It is a still further specific object of the present invention to provide electronic circuit instrumentation for sensing and reference impedances with a DC output and an AC excitation where the rectifying elements operate in a fully on condition with the full AC voltage across them.

It is yet a further specific object of the present invention to provide electronic circuit instrumentation for sensing and reference impedances which maintains a linear relationship between the sensing impedance and the output signal for large differences between the reference and sensing impedances

BRIEF SUMMARY OF THE INVENTION

These and other objects of the present invention are accomplished in a preferred embodiment comprising an oscillator or source directing alternating current from ground to first and second DC blocking impedance arms. The excitation through the first and second impedance arms passes through a diode matrix and on to ground through reference and sensing impedances respectively during one current polarity and through the sensing and reference capacitances respectively during the other current polarity. Charge accumulations on the impedances are inhibited by providing a DC return to ground from each of the junction points between the diode matrix and the first and second impedance arms through two respective low-pass filters and two DC meters or a differential amplifier. The net current through each meter indicates the difference between the reference and sensing impedances.

Normally all four impedances are capacitive with the first and second impedances of substantially lower value by at least an order of magnitude than the reference and sensing impedance. Alternatively the first and second impedances may be inductive and tuned with the capacitive sensing and reference impedances to the oscillator's frequency. The inductors, in a further alternative form, are inductively coupled to keep the voltage drop across them very small.

The construction and operation of the present invention will be more fully understood from the following detailed description of a preferred embodiment in conjunction with the accompanying drawings in which.

DETAILED DESCRIPTION OF THE PREFERRED EMBODIMENT

Figure 1:
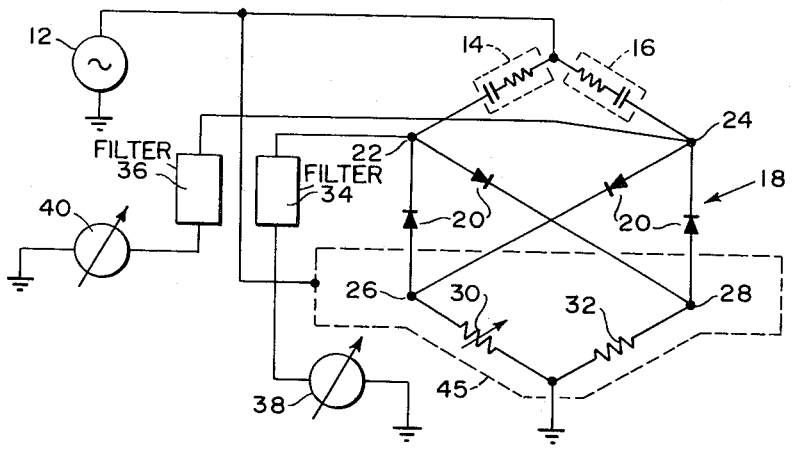
FIG. 1 shows a partial block and schematic diagram of a preferred embodiment of this invention.

Referring to FIG. 1 of the preferred embodiment there is shown an oscillator 12 which is a source of alternating electric current and whose high output is electrically connected to one side of first and second DC blocking impedance arms 14 and 16. A diode matrix 18 is composed of four series connected matched semiconductor diodes 20 forming a closed conduction path with all diodes oriented for conduction in the same direction. The first and second impedances 14 and 16 are electrically connected to the matrix 18 at opposite junction points 22 and 24 respectively between the diodes 20. The remaining junction points 26 and 28 of the diode matrix 18 are electrically connected to one terminal of variable sensing and reference impedances 30 and 32 respectively. The other terminals of impedances 30 and 32 are electrically tied to ground, a point in common with the low side of the oscillator 12.

Figure 1A:
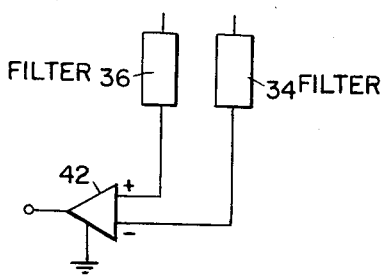
FIG. 1A shows a modification of the embodiment of FIG. 1.

Junction points 22 and 24 are in electrical contact with one side of respective elements 34 and 36 (typically inductors) with the other terminal thereof electrically connected to ground through DC current meters 38 and 40. Alternatively, as shown in FIG. 1A, elements 34 and 36 may be electrically connected to differential inputs of a differential current amplifier 42.

The impedances 14, 16, 30 and 32 may be predominantly resistive, inductive or capacitive at the frequency of the source 12 as long as impedances 14 and 16 have a DC open circuit. Of special interest is the case where these impedances are all capacitive and in particular where the impedances 14 and 16 are substantially smaller than the impedances 30 and 32. In this case the instantaneous voltages across the capacitances 30 and 32 are nearly equal so that there is little current loading the circuit through stray capacitances between the junctions 26 and 28 which are typically closely placed capacitance sensing and balancing electrodes of a capacitive probe. This feature also allows linear operation of this circuit when impedances 30 and 32 differ substantially.

The current through the impedances 30 and 32 will be inversely proportional to the value of those impedances. Since the diode matrix 18 directs current from the junctions 22 and 24 to the impedances 30 and 32 depending on the current polarity, the current at the junction 22 will have one-half cycle conducted through one of the impedances 30 and 32 and will have the other half-cycle conducted through the other impedance. Simultaneously junction 24 current will pass through the impedances 30 or 32 in the opposite order. Where the impedances 30 and 32 are unequal the half-cycles of current of opposite polarity at each junction 22 and 24 will differ in magnitude by an amount representative of the differences in the impedances 30 and 32. The difference in half-cycles of current at junctions 22 and 24 tend to produce a charge build-up across the impedance arms 14 and 16, but this DC build-up will be shunted through the elements 34 and 36 to meters 38 and 40 or as shown in FIG. 1A to amplifier 42. Thus the DC average or half-cycle current differences at the junctions 22 and 24 which deviate from zero by an amount representing the difference in the impedances 30 and 32 will be the output indication or signal of the circuit.

This DC average at junction 22 and 24 is small compared to the AC component at those points. Since only the current differences and not the whole circuit currents pass through the meters 38 and 40 or amplifier 42, filter elements 34 and 36 can be used to impede the high frequency component while the DC component is passed to meters 38 and 40 or amplifier 42. The elements 34 and 36 may be inductors of substantial impedance at the frequency of the source 12 or any low-pass filter.

Filter elements 34 and 36 may be attached to junctions 26 and 28 as well, but will produce stray impedance loading.

The diode matrix 18 accomplishes a rectification so that the signal of interest at junctions 22 and 24 is a DC signal. Nevertheless the diodes 20 pass the full current and voltage load of the circuit insuring that they are turned fully on and that their non-linearities are of minimal effect upon the output signal's linearity. By using diodes 20 with matched conduction characteristics and by keeping them in the same environment any change to one of the diodes will be a change to all the diodes and no significant error will be produced at the junctions 22 and 24 due to diode drift or inequalities.

Useful but significantly impaired performance can be achieved in the circuit of FIG. 1 if one of the impedances 30 and 32 is deleted along with the two diodes connected to it.

One improvement to the above circuits readily realized is a guard 45 at least partially enclosing or surrounding the impedances 30 (and 32) fed by the source 12. When the impedances 14 (and/or 16) are small compared to impedances 30 and 32 this guard 45 maintains capacitance sensitive elements within a flux-free environment and minimizes the effect of stray capacitance.

The impedances 14 and 16 may have an impedance value at the frequency of source 12 more nearly equal to the impedance value of impedances 30 and 32. In this case the unequal currents through the impedances 14 and 16 when the impedances 30 and 32 are unequal or unbalanced will produce both a DC current and a DC potential signal at the junctions 22 and 24. The dynamic range of the circuit can be increased as well by placing further diodes or impedances 44 in series with each diode 20 in the matrix 18 (as shown in FIG. 2).

In FIG. 1, the impedances 14 and 16 may be tuned with impedances 30 and 32 to the frequency of source 12. Impedances 14 and 16 can be inductive at this frequency while impedances 30 and 32 are capacitive. This tuned case greatly increases the sensitivity of the circuit, but also forces the instantaneous potential between the junctions 26 and 28 to vary with impedances 30 and 32.

Figure 2:
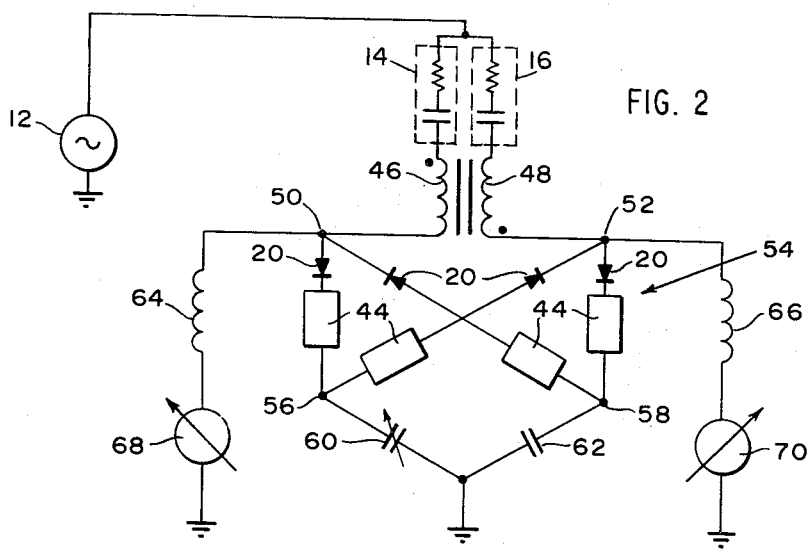
FIG. 2 shows in partial block and schematic diagram an alternative form to the embodiment of FIG. 1.

In FIG. 2 a modification is shown wherein the source 12 feeds one side of mutually coupled inductances 46 and 48 through the elements 14 and 16. The coupling between the inductances 46 and 48 induces a voltage in each inductance 46 and 48 opposing the voltage induced in the inductance itself. The other sides of the inductances 46 and 48 are electrically connected to junctions 50 and 52 respectively of a diode matrix 54 which is the same as the matrix 18 except that the additional series connected elements 44 are included as above described. These elements 44 are not necessary for the operation of the FIG. 2 circuit however. The remaining two junction points 56 and 58 are electrically joined to variable capacitance 60 and capacitance 62 respectively with their other terminals grounded. Inductances 64 and 66 electrically lead from junctions 50 and 52 to meters 68 and 70 respectively.

Under the conditions where the coupling between the mutually coupled inductances is close, the self-inductances of the inductances 46 and 48 are equal and the impedances of capacitances 60 and 62 are nominally equal, the voltage drop across the inductances 46 and 48 is reduced to substantially zero so that the instantaneous potentials at junctions 50 and 52 are nearly equal and the sensitivity of the circuit is increased. This near equality is disrupted by variations in capacitance 60, though the circuit's sensitivity is maintained.

Having now described a preferred embodiment and several alternative forms for this invention it will become clear that further modifications and alterations can be made and stay within the spirit of this invention.
What is claimed is:

1. An impedance comparing circuit for operating from a source of alternating electric excitation, said circuit comprising:
   a. DC blocking first and second impedances joined at a first terminal;
   b. a reference impedance;
   c. a sensing impedance joined at a second terminal to said reference impedance;
   d. means for conducting one polarity of excitation through said first and second impedances and serially through said reference and sensing impedances respectively and for conducting the other polarity of excitation through said first and second impedances and serially through said sensing and reference impedances respectively; and
   e. means for detecting at least one signal indicative of the difference between polarities in the excitation through at least one of said first and second impedances whereby an indication is given of the difference in impedance between said reference and sensing impedances.

2. The circuit of claim 1 further characterized by having said reference and sensing impedances capacitive impedances.

3. The circuit of claim 1 wherein said means for detecting further includes:
   a. means for low-pass filtering of said signal; and
   b. means for metering said signal after it is low-pass filtered.

4. The circuit of claim 1 further characterized by having means for amplifying the difference in a pair of said detected signals indicative of the difference in excitation through said first and second impedances.

5. The circuit of claim 1 wherein said first and second impedances are substantially smaller in impedance than said reference and sensing impedances whereby the instantaneous electric potential across said reference and sensing impedances is approximately equal.

6. The circuit of claim 5 wherein said reference and sensing impedances are capacitive impedances.

7. The circuit of claim 1 wherein said first and second impedances are tuned with said reference snd sensing impedances to the excitation frequency of said source.

8. The circuit of claim 1 further characterized by having means for inducing an opposition to the excitation in said first impedance dependent on the excitation through said second impedance and for inducing an opposition to the excitation in said second impedance dependent on the excitation through said first impedance.

9. The circuit of claim 1 wherein said means for conducting includes a closed path of four serially joined, matched semiconductor diodes oriented for conduction in the same direction with said first and second impedances making respective electrical contacts at opposite junctions between diodes in said path and with said reference and sensing impedances making respective electrical contacts at the other two opposite junctions between diodes in said path.

10. The circuit of claim 9 wherein each diode in said path has impedance connected in series with it between junctions with the next diodes in said path.

11. The circuit of claim 1 further comprising means for guarding said sensing and reference impedances.

12. The circuit of claim 1 further characterized by having means for amplifying at least one of said signals indicative of the difference in excitation through said first and second impedances.

* * * * *